(12) United States Patent
Fernsten

(10) Patent No.: US 9,956,979 B1
(45) Date of Patent: May 1, 2018

(54) STROLLER ATTACHMENT

(71) Applicant: Patrick Fernsten, Canton, MA (US)

(72) Inventor: Patrick Fernsten, Canton, MA (US)

( * ) Notice: Subject to any disclaimer, the term of this patent is extended or adjusted under 35 U.S.C. 154(b) by 0 days. days.

(21) Appl. No.: 15/660,597

(22) Filed: Jul. 26, 2017

Related U.S. Application Data

(60) Provisional application No. 62/426,413, filed on Nov. 25, 2016.

(51) Int. Cl.
*B62B 9/00* (2006.01)
*B62B 7/00* (2006.01)
*H02J 7/14* (2006.01)
*H02J 7/35* (2006.01)
*H02J 7/00* (2006.01)

(52) U.S. Cl.
CPC .............. *B62B 9/005* (2013.01); *B62B 7/00* (2013.01); *H02J 7/0052* (2013.01); *H02J 7/1407* (2013.01); *H02J 7/35* (2013.01)

(58) Field of Classification Search
CPC .......... B62B 9/005; B62B 7/00; F16M 13/02; F16M 13/022; A47B 2097/005
See application file for complete search history.

(56) References Cited

U.S. PATENT DOCUMENTS

| | | | | |
|---|---|---|---|---|
| 245,659 A * | 8/1881 | Renner, Jr. | ................ | B62B 9/14 135/114 |
| 4,359,266 A * | 11/1982 | Rohlf | ...................... | B62B 9/005 280/647 |
| 5,154,390 A * | 10/1992 | Bain | ...................... | A47B 97/04 248/284.1 |
| 5,259,582 A * | 11/1993 | DeLange, III | ........... | B62J 29/00 248/481 |
| 6,217,180 B1 * | 4/2001 | Eisenbraum | ............ | B62B 9/005 359/871 |
| 6,390,424 B1 * | 5/2002 | Kidushim | .............. | A45D 20/12 248/122.1 |
| 6,485,154 B1 * | 11/2002 | Nolan-Brown | ......... | B60R 1/008 359/872 |
| 6,499,851 B1 * | 12/2002 | Kelly | ...................... | B60R 1/003 248/480 |
| 7,097,314 B1 * | 8/2006 | Darling | ................... | B60R 1/008 359/872 |
| 2003/0132612 A1 * | 7/2003 | Pike | ....................... | A63B 24/00 280/642 |
| 2005/0006542 A1 * | 1/2005 | Henning | ................. | F16C 11/10 248/274.1 |
| 2008/0029663 A1 * | 2/2008 | Derry | .................. | A47B 21/0314 248/178.1 |
| 2010/0032535 A1 * | 2/2010 | Elliott | .................... | B25H 3/006 248/229.22 |
| 2010/0207003 A1 * | 8/2010 | Bruno | .................... | F16M 11/40 248/231.21 |
| 2010/0264182 A1 * | 10/2010 | Perlman | .................. | H04M 1/04 224/409 |

(Continued)

*Primary Examiner* — Erez Gurari
(74) *Attorney, Agent, or Firm* — Barlow, Josephs & Holmes, Ltd.

(57) ABSTRACT

A support device is provided that can attach to or be integrated with a baby stroller, that combines a mirror, a charging apparatus, an electronic device support and a remote control system in a manner that allows simultaneous charging of the electronic device, accessing of electronic device content and two way interaction between the user and the baby seated in the forward facing stroller.

20 Claims, 4 Drawing Sheets

(56) References Cited

U.S. PATENT DOCUMENTS

| | | | |
|---|---|---|---|
| 2012/0132685 A1* | 5/2012 | Lee | B60R 11/0258 |
| | | | 224/553 |
| 2013/0256478 A1* | 10/2013 | Reda | B60R 11/02 |
| | | | 248/205.1 |
| 2015/0366336 A1* | 12/2015 | Wong | F16M 11/14 |
| | | | 248/371 |
| 2016/0131305 A1* | 5/2016 | Trinh | F16M 13/022 |
| | | | 248/229.15 |
| 2017/0313340 A1* | 11/2017 | Stransky | B62B 9/005 |
| 2017/0328512 A1* | 11/2017 | Brown | F16M 11/041 |

* cited by examiner

STROLLER ATTACHMENT

CROSS-REFERENCE TO RELATED APPLICATIONS

This application is related to and claims priority from earlier filed US Provisional Patent Application No. 62/426,413, filed Nov. 25, 2016.

BACKGROUND OF THE INVENTION

The present invention relates generally to an accessory or a modular attachment for use with a baby stroller. More specifically, the present invention relates to an accessory or a modular attachment for a stroller that includes a mirror, an electronic device mount, a charging station and optionally a remote control interface for the electronic device that allows improved interaction between the baby in the stroller, the adult operating the stroller and the electronic device.

Over recent years there has been an upsurge in electronic mobile device usage worldwide. Electronic mobile devices, including cell phones, tablets, electronic readers, and the like are capable of wirelessly displaying text, audio, and video. When using an electronic device, a user is normally required to hold the device in his or her hands which can pose problems if the user is engaged in another activity. Alternatively, the user may place the electronic mobile device on a table, countertop, or another location which may not be suitable for displaying and holding the electronic mobile device at an appropriate angle for viewing.

Further, individuals are often forced to look down at their electronic devices when reading, playing games, and the like thereon. This can cause neck and back pain and can become very uncomfortable after prolonged periods of use. Still further, individuals are required to utilize both hands in order to hold the device and use it at the same time. The device can slip from one's hand and fall on the ground causing damage to the screen and other areas. Accordingly, there exists a need for an electronic device holder that allows a user to remain handsfree while having easy access to their device when needed.

Devices have been disclosed that relate to adjustable electronic device holders. One example is a flexible support apparatus having removable clips adapted to secure the electronics thereon. The apparatus consists of a series of ball and socket connectors interconnected into a flexible chain having the removable clips disposed at one or both ends of the chain. The apparatus is adapted to wrap around and grip an element, such as a pole, while supporting a device such as a camera, flash unit, cell phone, or other item. This arrangement is inconvenient because single arm and socket connectors limit the versatility and usage of the device.

There are also hands-free electronic device holders for holding handheld electronic devices. The hands-free device holder has a flexible adjustable gooseneck and a pocket member that secures to the backside of the handheld electronic device. The pocket member is impractical based on the orientation limitation that is required to secure the mobile electronic device therein. Similar universal mounting assemblies have been devised for quick mounting an object to a stand device. The device comprises a body having a support surface, a front face and an opposed mounting surface configured to mount to the support stand. The universal mounting assembly lacks a flexible arm that can selectively position the attached electronic mobile device.

Most of the known prior art devices have several drawbacks. The devices in the prior art generally relate to adjustable electronic device holders adapted to secure an electronic device therein. However, the devices in the prior art are not adapted to wrap around and grip a fixed object at a first end and a clamp mechanism adapted to secure a mobile electronic device at a second end. Further, the devices fail to provide a clamp mechanism for securing the mobile electronic device and, as a result, are not well suited for enabling a user to operate a mobile electronic device such as a cell phone, tablet, or electronic reader, hands free.

Additional disadvantages include being difficult to use, being unduly complex, being expensive, being limited in motion, being limited in adjustability, being too bulky, being difficult to set up, being cumbersome to use, being limited in use, and failing to couple to other objects/surfaces.

There is, therefore, a need for a unique support device that can attach to or be integrated with a baby stroller, that combines a mirror, a charging apparatus, an electronic device support and a remote control system in a manner that allows simultaneous charging of the electronic device, accessing of electronic device content and two way interaction between the user and the baby seated in the forward facing stroller.

BRIEF SUMMARY OF THE INVENTION

In this regard, the present invention provides for a support device that is integrated with or attached to a forward facing stroller apparatus. The support device is configured and arranged for releasable attachment in a manner that allows both removal and easy and secure repositioning while further supporting, at an opposing end, an electronic device such as a smart phone or tablet computer.

Preferably the support device provides a support mechanism to receive and retain the electronic device, in addition to including a mirror that allows the user of the stroller to interact with a baby seated in the stroller. Still further, in one embodiment the electronic device may be received and retained behind such a mirror. In a further embodiment, the electronic device may be received and retained in a position along the support device such that both the mirror and electronic device can be seen and interacted with simultaneously.

In another arrangement, the support device includes a charging mechanism that allows a user to charge the electronic device received within the support device while in use.

In still a further arrangement, the support device includes a wireless controller that allows a user of the stroller to easily and conveniently control the electronic device that is received within the support device of the present disclosure.

It is therefore, an object of the present invention to provide a unique support device that can attach to or be integrated with a baby stroller, that combines a mirror, a charging apparatus, an electronic device support and a remote control system in a manner that allows simultaneous charging of the electronic device, accessing of electronic device content and two way interaction between the user and the baby seated in the forward facing stroller.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be made to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIG. 1A depicts an alternate support head for the support device of the present invention;

DETAILED DESCRIPTION OF THE INVENTION

Figure 1:
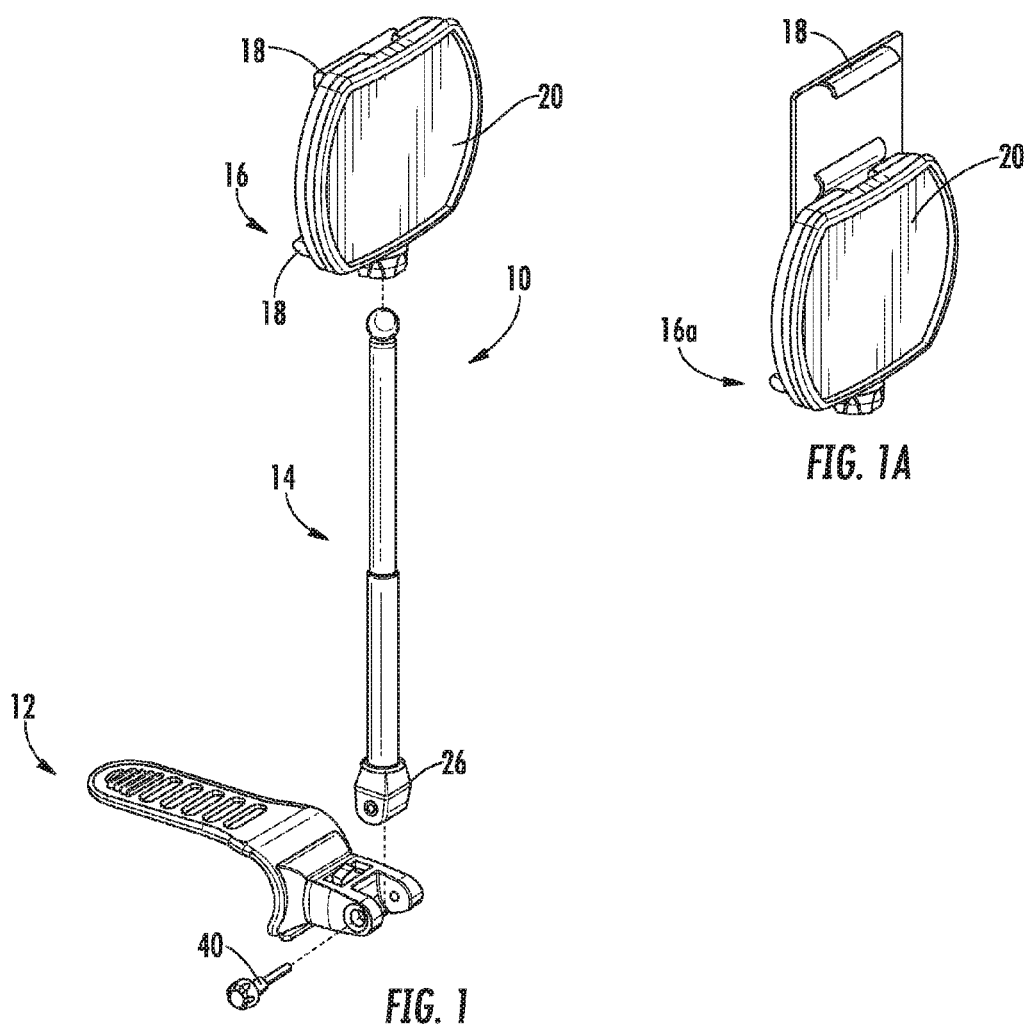
FIG. 1 is a front perspective view of a support device in accordance with the present invention.

Now referring to the drawings, a support device is illustrated that is integrated with or attached to a forward facing stroller apparatus. The support device is configured and arranged for releasable attachment in a manner that allows both removal and easy, secure repositioning while further supporting, at an opposing end, an electronic device such as a smart phone or tablet computer.

Turning first to FIG. 1, a support device 10 is shown to include a base attachment 12 a support arm 14 and an upper head assembly 16. Preferably the support device 10 provides a support clamp 18 to receive and retain an electronic device in addition to including a mirror 20 that allows the user of the stroller to interact with a baby seated in the stroller. In an alternate arrangement depicted at FIG. 1A, in one embodiment a head assembly 16a provides for the electronic device to be received and retained by a support clamp 18 in a position on the head assembly 16a, such that both the mirror 20 and electronic device retained within the support clamp 18 can both be seen and interacted with simultaneously. Accordingly, it can be seen that the present invention intends that the head assembly not be limited in configuration in that the mirror 20 and clamp assembly 18 may be back to back, side by side, or over and under, while all still falling within the present disclosure.

Figure 2:
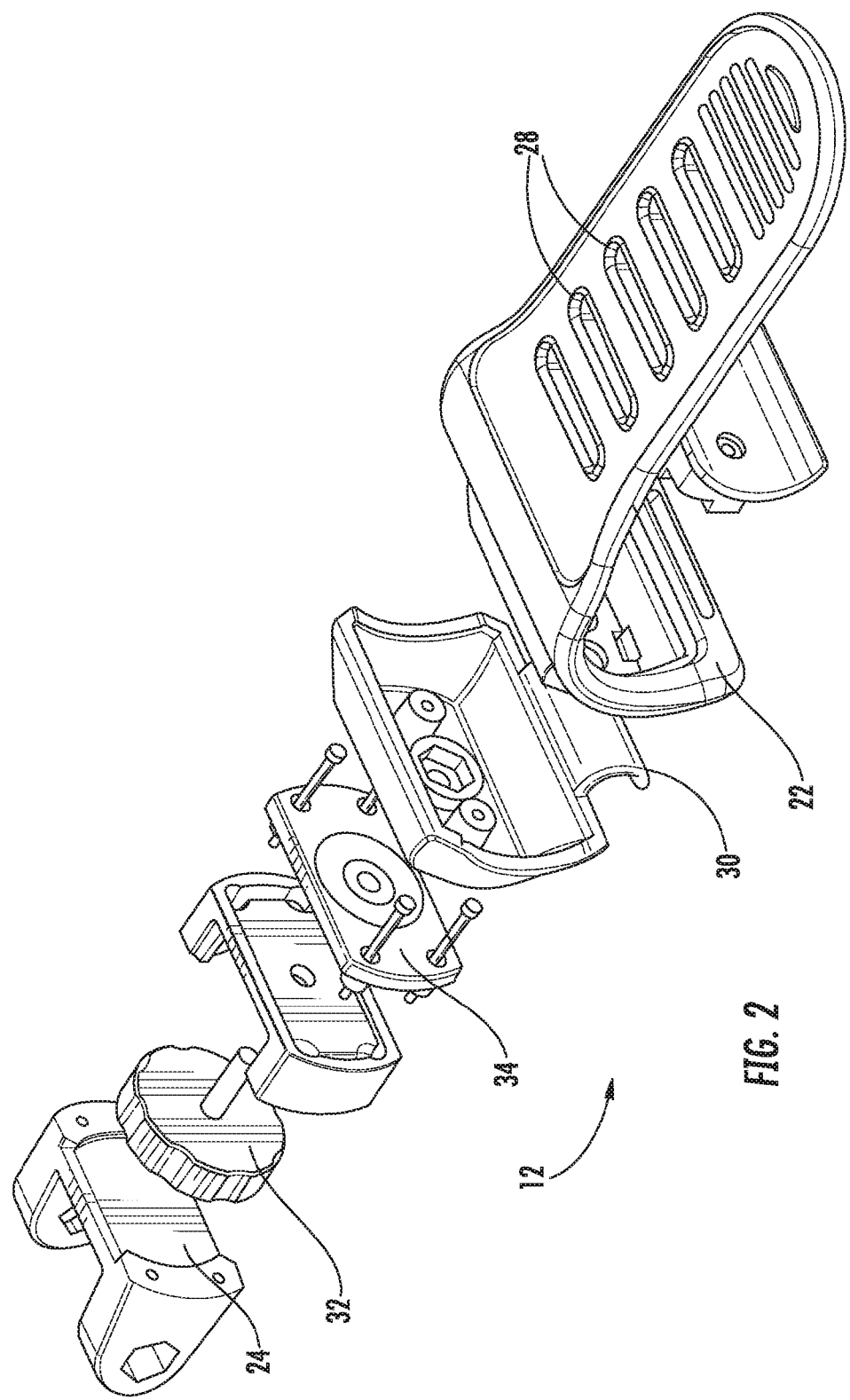
FIG. 2 is an exploded perspective view of a base attachment for the support device of the present invention.

Turning to FIG. 2, the base attachment 12 is illustrated in one embodiment. Most generally, the present invention discloses that the base attachment 12 of the support device be configured and arranged to engage with one of the pipes that typically are used to construct the frame of a stroller. One skilled in the art can appreciate that, while a particular arrangement is shown, the disclosure herein is intended to encompass any suitable engagement means. In an illustrative embodiment the base attachment 12 includes a strap 22 that wraps around and releasably engages a stroller frame and a receiver 24 that pivotally engages with a lower end 26 of the support arm 14. The strap 22 includes a plurality of openings 28, such as holes or slots that allow the strap 22 to be wrapped tightly around a stroller frame and then firmly received and retained by hook 30. This arrangement allows for the base attachment 12 to be adjustable and securely fastened about a variety of differently dimensioned frame members. A locking nut 32 cooperates with a rotatable base 34 to allow the receiver to be rotated relative to the strap 22 so that the orientation of the receiver 24 can be adjusted to a desired position relative to the stroller frame once the strap 22 is fastened thereabout, while tightening of the locking nut 32 then maintains the orientation as set by the user. It should be appreciated that the strap is preferably an elastomer material although any other suitable strap material is also intended to fall within the scope of the present disclosure.

Figure 3:
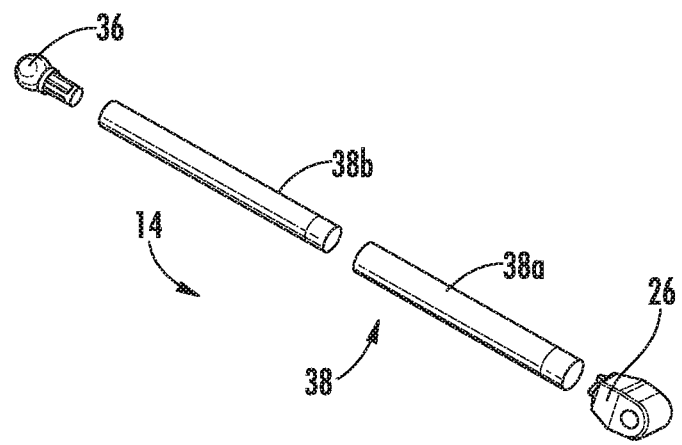
FIG. 3 is an exploded perspective view of a support arm for the support device of the present invention.

Turning now to FIG. 3, the support arm 14 can be seen to have a bottom end 26 a top end 36, and a shaft 38 extending therebetween. The shaft 28 may be of unitary construction or may be of two piece construction having two telescoping components 38a and 38b that interfit to allow telescoping adjustment of the length of the support arm 14 in any means previously known in the art. The bottom end 26 is configured to interfit into the receiver 24 to form a hinged connection that can be fixed in place once set using bushings, lock screws 40 or any other suitable means known in the art. At the top end 36 of the support arm 14 is a fitting to engage with the head assembly 16. Preferably the engagement is a ball and socket arrangement as shown, although any pivoting or swiveling attachment as known in the art may also be utilized to form this engagement.

Figure 4:
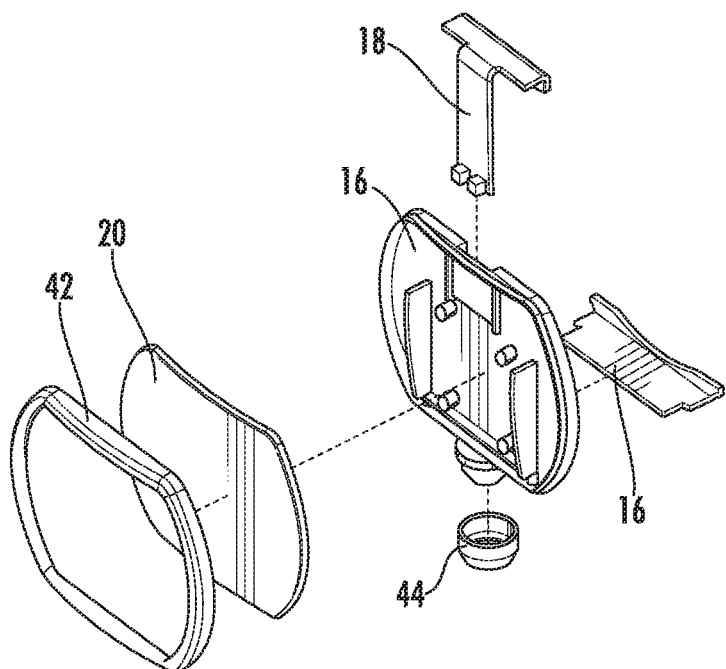
FIG. 4 is an exploded perspective view of an upper head assembly of the present invention.

FIG. 4 illustrates the support head 16 in one embodiment with a mirror 20 and a clamp 18 for receiving and retaining an electronic device securely therein. The mirror is retained on the support head 16, preferably by clamp 42 although adhesive attachment may also be employed. Further a socket with a tightening ring 44 is shown to engage with the top end 36 of the support arm 14. As stated above, while the mirror and electronics clamp are shown at opposing sides of the support head 16, it should be appreciated that the clamp and mirror may also be adjacent one another and positioned on the same side of the support head 16.

Figure 5:
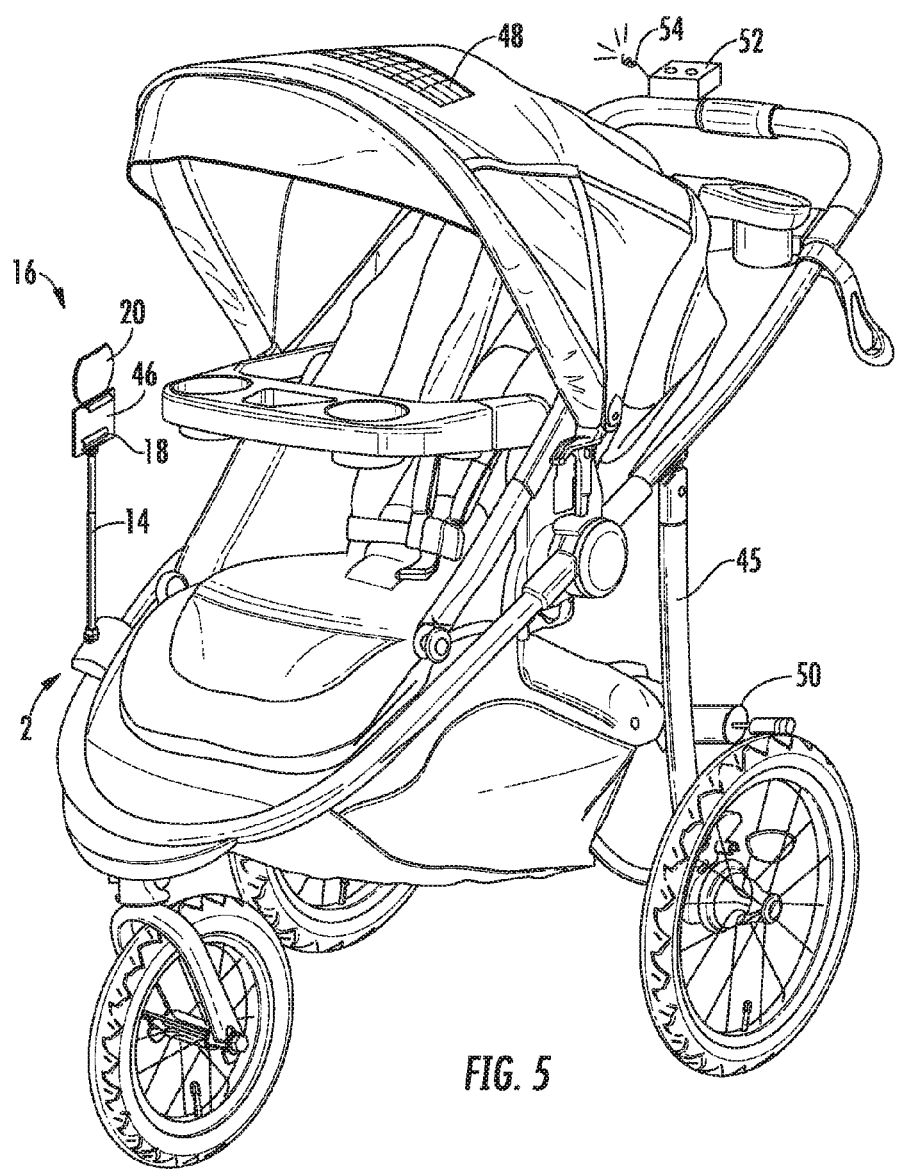
FIG. 5 depicts the support device in conjunction with a stroller.

As can be seen at FIG. 5, a traditional jogging stroller is illustrated at 45. The support mechanism is shown attached to a frame member, such that the base attachment 12 is engaged therewith and the support head 16 illustrates the mirror 20 and electronic device 46 received in the clamp 18, both oriented so that both a baby seated in the stroller and a user of the stroller can view the mirror and the electronic device, and both the seated baby and user can engage with one another via the mirror 20 and the electronic device. Further, while the support arm is shown affixed to the stroller using the base attachment 12, one skilled in the art should appreciate that the stroller can integrally include a base attachment formed as a part of the stroller frame.

Also shown in FIG. 5 are two alternative charging mechanisms for use with the electronic device. A solar cell array 48 may be placed onto the canopy of the stroller or any other flat suitable location to supply a charge to the electronic device 46. Similarly a small DC generator 50 may be mounted to the stroller frame and engaged with a wheel of the stroller such that the rolling wheel turns the generator 50 to generate power to charge the electronic device 46. In either case, wires from the solar cell 48 or generator 50 may be routed along or through the frame of the stroller and to the support arm to charge the electronic device 46 via the appropriate device interface, as is well known in the art, such as USB, MicroUSB, Lightening Adapter and the like. Further still, as inductive charging has become more wide spread, the support head may include inductive coils to interact with the inductive charging circuitry within the electronic device 46 to charge the electronic device 46 in that manner.

Finally, a remote control device 52 can be seen provided on the handle of the stroller. The remote control device allows the user of the stroller to control the content being displayed or played on the electronic device 46 via antenna and Bluetooth connectivity as is well-known in the art. This allows the user of the stroller to employ the electronic device to take photos or videos of the baby seated in the stroller, play and change music, display videos, display photos as well as controlling many other useful functions. [25] It can, therefore, be seen that the present invention provides a unique support device that can attach to or be integrated with a baby stroller, that combines a mirror, a charging apparatus, an electronic device support and a remote control system in a manner that allows simultaneous charging of the electronic device, accessing of electronic device content and two way interaction between the user and the baby seated in the forward facing stroller. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. An electronics support device for releasable attachment to a stroller, comprising:
   a base attachment to releasably engage a frame member of a stroller;
   a support arm having a bottom end movably engaged with said base attachment and a top end opposite said bottom end; and
   an upper head assembly movably engaged with said top end of said support arm, said upper head assembly including a mirror affixed thereto and a clamp assembly for receiving and retaining an electronic device therein.

2. The electronics support device of claim 1, wherein said mirror and said clamp assembly are on opposing sides of said upper head assembly.

3. The electronics support device of claim 1, wherein said mirror and said clamp assembly are adjacent one another on the same side of said upper head assembly.

4. The electronics support device of claim 1, wherein said base attachment further comprises:
   a strap having a plurality of openings therein; and
   a hook to engage said openings when said strap is extended around a frame member of a stroller.

5. The electronics support device of claim 1, wherein a position of said upper head assembly can be adjusted relative to said support arm and locked in position at a desired orientation.

6. The electronics support device of claim 1, wherein a position of said support arm can be adjusted relative to said base attachment and locked in position at a desired orientation.

7. The electronics support device of claim 1, further comprising:
   a charging device positionable on said stroller for charging an electronic device received within said clamp assembly.

8. The electronics support device of claim 7, wherein said charging device is a solar array.

9. The electronics support device of claim 7, wherein said charging device is a generator.

10. The electronics support device of claim 1, further comprising:
    a remote controller positionable on said stroller for controlling an electronic device received within said clamp assembly.

11. A stroller, comprising:
    a frame having at least a seat, a handle and wheels affixed thereto; and
    an electronics support device extending from said frame, comprising:
       a base attachment engaging said frame of said stroller;
       a support arm having a bottom end movably engaged with said base attachment and a top end opposite said bottom end; and
       an upper head assembly movably engaged with said top end of said support arm, said upper head assembly including a mirror affixed thereto and a clamp assembly for receiving and retaining an electronic device therein.

12. The stroller of claim 11, wherein said mirror and said clamp assembly are on opposing sides of said upper head assembly.

13. The stroller of claim 11, wherein said mirror and said clamp assembly are adjacent one another on the same side of said upper head assembly.

14. The stroller of claim 11, wherein said base attachment releasably engages with said stroller and further comprises:
    a strap having a plurality of openings therein; and
    a hook to engage said openings when said strap is extended around said frame of said stroller.

15. The stroller of claim 11, wherein a position of said upper head assembly can be adjusted relative to said support arm and locked in position at a desired orientation.

16. The stroller of claim 11, wherein a position of said support arm can be adjusted relative to said base attachment and locked in position at a desired orientation.

17. The stroller of claim 11, further comprising:
    a charging device positioned on said stroller for charging an electronic device received within said clamp assembly.

18. The stroller of claim 17, wherein said charging device is a solar array.

19. The stroller of claim 17, wherein said charging device is a generator engaged with one of said stroller wheels.

20. The stroller of claim 11, further comprising:
    a remote controller on said stroller for controlling an electronic device received within said clamp assembly.

* * * * *